(12) United States Patent
Schmidt et al.

(10) Patent No.: US 9,228,066 B2
(45) Date of Patent: *Jan. 5, 2016

(54) POLYMER MATERIAL AND METHOD FOR THE PRODUCTION THEREOF

(75) Inventors: Harald Schmidt, Emmerich (DE); Christoph Hess, Kleve (DE); Johannes Mathar, GP's-Heerenberg (NL); Ralf Hackfort, Emmerich (DE)

(73) Assignee: BIOTEC BIOLOGISCHE NATURVERPACKUNGEN GMBH & CO. KG, Emmerich (DE)

( * ) Notice: Subject to any disclaimer, the term of this patent is extended or adjusted under 35 U.S.C. 154(b) by 73 days.

This patent is subject to a terminal disclaimer.

(21) Appl. No.: 12/739,403

(22) PCT Filed: Oct. 22, 2008

(86) PCT No.: PCT/EP2008/064270
§ 371 (c)(1),
(2), (4) Date: Apr. 22, 2010

(87) PCT Pub. No.: WO2009/053383
PCT Pub. Date: Apr. 30, 2009

(65) Prior Publication Data
US 2010/0249268 A1    Sep. 30, 2010

(30) Foreign Application Priority Data

Oct. 22, 2007 (DE) .......................... 10 2007 050 769

(51) Int. Cl.
| | | |
|---|---|---|
| *C08L 63/00* | (2006.01) |
| *C08J 5/18* | (2006.01) |
| *C08L 3/02* | (2006.01) |
| *C08L 67/00* | (2006.01) |
| *C08L 23/08* | (2006.01) |
| *C08L 25/18* | (2006.01) |
| *C08L 33/06* | (2006.01) |

(52) U.S. Cl.
CPC .... *C08J 5/18* (2013.01); *C08L 3/02* (2013.01); *C08L 67/00* (2013.01); *C08J 2367/00* (2013.01); *C08L 23/0884* (2013.01); *C08L 25/18* (2013.01); *C08L 33/068* (2013.01); *C08L 63/00* (2013.01); *C08L 2201/06* (2013.01)

(58) Field of Classification Search
CPC ........... C08L 63/00; C08L 3/02; C08L 67/00; C08J 5/18
See application file for complete search history.

(56) References Cited

U.S. PATENT DOCUMENTS

| | | | |
|---|---|---|---|
| 5,635,550 A | 6/1997 | Dehennau et al. |
| 6,231,970 B1 | 5/2001 | Andersen et al. |
| 6,242,102 B1 | 6/2001 | Tomka |
| 6,821,588 B1 | 11/2004 | Hammer et al. |
| 2003/0092793 A1 | 5/2003 | Liu et al. |
| 2010/0305240 A1 | 12/2010 | Schmidt |

FOREIGN PATENT DOCUMENTS

| | | |
|---|---|---|
| CN | 1833002 | 9/2006 |
| DE | 198 22 979 | 12/1999 |
| EP | 0554939 A | 8/1993 |
| EP | 0 596 437 | 5/1994 |
| EP | 1858951 EP | 11/2005 |
| JP | H07-258488 | 10/1995 |
| JP | 06-313063 | 7/1996 |
| JP | 10-077395 | 3/1998 |
| JP | 10-158485 | 6/1998 |
| JP | 11-124485 | 5/1999 |
| JP | 10-152602 | 12/1999 |
| JP | 2003-145534 A | 5/2003 |
| JP | 2006-306965 A | 11/2006 |
| KR | 2000 031 683 | 6/2000 |
| KR | 2003 0022914 | 3/2003 |
| WO | 93/03098 | 2/1993 |
| WO | 96/31561 | 10/1996 |
| WO | 2005/017034 | 2/2005 |
| WO | WO2005108475 | 11/2005 |

OTHER PUBLICATIONS

Kim et al., "Reactive Blends of Gelatinized Starch and Polycaprolactone-G-Glycidyl Methacrylate", Journal of Applied Polymer Science, Aug. 8, 2001.
Lee et al., "Process for preparing biodegradable resin compositions", Chemical Abstracts Service, Columbus, OH, Database accession No. 136:341532, Abstract.
International Preliminary Report on Patentability—PCT/EP2008/064269.
International Preliminary Report on Patentability—PCT/EP2008/064270.
Office Action issued in Chinese Patent App. No. 200880112792 dated Aug. 31, 2012.
U.S. Appl. No. 12/739,396, filed Mar. 16, 2012, Office Action.
U.S. Appl. No. 12/739,396, filed Sep. 20, 2012, Final Office Action.
U.S. Appl. No. 12/739,396, filed Nov. 29, 2012, Advisory Action.
U.S. Appl. No. 12/739,396, filed Jan. 28, 2013, Office Action.
U.S. Appl. No. 12/739,396, filed May 2, 2013, Notice of Allowance.
Office Action in Japanese Application No. JP2010-530437 dated Jul. 30, 2013.
Office Action in Japanese Application No. JP2010-530438 dated Jul. 30, 2013.
Reexamination Decision cited in Chinese Application No. 200880112792.4 dated Sep. 6, 2015.

*Primary Examiner* — Peter D Mulcahy
(74) *Attorney, Agent, or Firm* — Workman Nydegger

(57) ABSTRACT

A method for the production of a polymer material is shown and described, which is characterized by: a) producing a mixture containing at least 1 to 75 wt.-% starch and/or starch derivative, 10 to 85 wt.-% polyester, and 0.01 to 7 wt.-% of a polymer containing an epoxy group; (b) homogenizing the mixture while supplying thermal and/or mechanical energy; (c) setting the water content of the mixture, so that the end product has a water content less than approximately 12 wt.-%, in relation to the total composition of the mixture. The polymer material produced with the method according to the invention is characterized by outstanding mechanical properties.

68 Claims, 7 Drawing Sheets

POLYMER MATERIAL AND METHOD FOR THE PRODUCTION THEREOF

BACKGROUND

The invention relates to a polymer material containing starch, to a method for the production thereof and to moulded parts, films and/or fibres produced from the material.

Polymer materials based on starch, which contain starch in combination with one or more thermoplastic polymers, e.g. polyesters, are generally known. The production and properties of unplasticised polymer blends containing starch are described, for example, in the publications EP 0 596 437 B1 and EP 0 917 540 B1.

Generally, unplasticised polymer blends containing starch contain up to a proportion of at most approximately 33 wt. % based on the total composition of the polymer blend. Although a further increase in the starch proportion would be desirable for economic and ecological reasons, this is not easily possible as an increase in the starch proportion generally is accompanied by a considerable deterioration in the mechanical properties of the polymer.

An unplasticised polymer blend based on starch, which is suitable in particular for blow film extruding, flat film extruding and injection moulding completely biodegradable products, is commercially available under the registered trade name "Bioplast® GF 106/02" from Biotec GmbH & Co. KG in Emmerich (Germany).

SUMMARY

The invention aims at improving the mechanical properties of the materials containing starch mentioned in the preamble and of the products produced from them (e.g. moulded parts, films and/or fibres). In particular, the invention aims at providing unplasticised polymer blends based on starch, which have as high a starch content as possible and, at the same time, excellent mechanical properties.

This object is achieved according to the invention by a method for producing a polymer material which is characterised by:

(a) Producing a mixture containing at least
   1 to 75 wt. % of starch and/or starch derivative
   10 to 85 wt. % of polyester and
   0.01 to 7 wt. % of an epoxide group-containing polymer;
(b) Homogenising the mixture by supplying thermal and/or mechanical energy;
(c) Setting the water content of the mixture, so that the end product has a water content of less than approximately 12 wt. % based on the total composition of the mixture.

Advantageous embodiments of the invention are described in the dependent claims.

DETAILED DESCRIPTION

Figure 1:
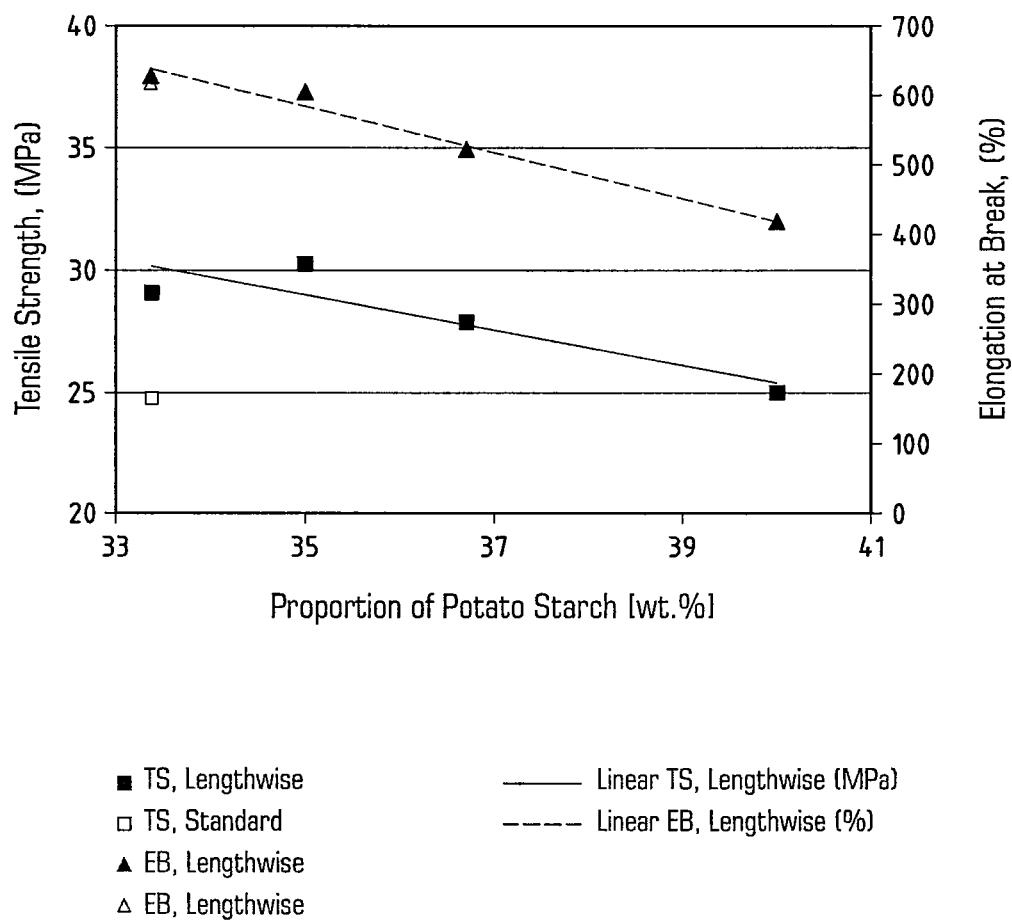
FIG. 1 is a graph showing the effect of starch proportion on tensile strength and elongation at break.

A fundamental feature of the method according to the invention is the addition of an epoxide group-containing polymer. Surprisingly, it was found that the presence of epoxide group-containing polymers as an additive during the production of polymer materials containing starch leads to a significant improvement in the mechanical properties of the material, in particular in its tensile strength, elongation at break and dart drop values.

The polymer material produced according to the method according to the invention is characterised by excellent mechanical properties. Thus, a film produced from the polymer material can have a tensile strength in accordance with DIN 53455 of 5 to 60 N/mm$^2$, in particular of 10 to 40 N/mm$^2$ and/or an elongation at break in accordance with DIN 53455 of 100 to 1,000%, in particular of 200 to 800%.

Furthermore, with the method according to the invention for the first time unplasticised polymer blends based on starch can be produced with a starch content greater or equal to 34 wt. %, wherein films produced from the polymer blends have an elongation at break in accordance with DIN 53455 of at least 300% and/or a dart drop value in accordance with ASTM D-1709 of at least 10 g/μm.

The method according to the invention makes provision for a mixture containing starch or starch derivative, polyester and epoxide group-containing polymer to be homogenised.

The production of thermoplastic polymers containing starch by homogenising a starting mixture containing starch is generally known and usually takes place in an extruder. Suitable production methods for thermoplastic polymers containing starch are described, for example, in the publications EP 0 596 437 B1 and EP 0 917 540 B1.

The starch and starch derivative used in the method according to the invention are preferably selected from native potato starch, tapioca starch, rice starch and maize starch.

According to one preferred embodiment of the invention, the mixture contains 5 to 75 wt. %, in particular 10 to 75 wt. %, preferably 15 to 70 wt. %, more preferably 25 to 55 wt. %, most preferably 34 to 51 wt. % of starch and/or starch derivative.

The polyester contained in the mixture is preferably selected from the group consisting of aliphatic-aromatic copolyester, aliphatic polyester, aromatic polyesters, PHA, PLA, PHB and PHBV.

For the method according to the invention, polyesters are in particular (but not exclusively) considered which are biodegradable in accordance with EN13432 and/or have a glass transition temperature (Tg) of less than 0° C., in particular less than −4° C., more preferably less than −10° C., even more preferably less than −20° C. and most preferably less than −30° C. The polyesters used in the method according to the invention are furthermore preferably thermoplastic.

According to a particularly preferred embodiment of the invention, a copolyester, in particular a random copolyester, is used as the aliphatic-aromatic polyester, based at least on adipic acid. More preferably, it is a copolyester or random copolyester, based at least on 1,4-butanediol, adipic acid and terephthalic acid or terephthalic acid derivative (e.g. dimethyl terephthalate DMT). This in particular can have a glass transition temperature (Tg) of −25 to −40° C., in particular −30 to −35° C., and/or a melting range of 100 to 120° C., in particular 105 to 115° C.

Suitable polyesters are, moreover, in particular aliphatic polyesters which are selected from the group consisting of polyhydroxyvalerate, polyhydroxybutyrate-hydroxyvalerate copolymer and polycaprolactone. More preferred aliphatic polyesters are those based on succinate, wherein the polyester can in particular be selected from the group consisting of polybutylene succinate (PBS), polybutylene succinate adipate (PBSA) and polyethylene succinate (PES), or mixtures thereof.

The polyester content in the mixture is preferably 20 to 85 wt. %, in particular 30 to 80 wt. %, more preferably 40 to 80 wt. %, based on the total composition.

The polymer material according to the invention also contains an epoxide group-containing polymer, this preferably being an epoxide group-containing copolymer. Epoxide group-containing polymers or copolymers especially considered are those having a molecular weight (Mw) of 1,000 to 25,000, in particular 3,000 to 10,000.

Preferably, the epoxide group-containing polymer is a glycidyl(meth)acrylate-containing polymer. A suitable glycidyl (meth)acrylate-containing polymer is, for example, a copolymer consisting of (a) styrene and/or ethylene and/or methyl methacrylate and/or methyl acrylate and (b) glycidyl(meth) acrylate. Particularly well suited as the glycidyl(meth)acrylate-containing polymer is a copolymer which is selected from the group consisting of styrene-methyl methacrylate-glycidyl methacrylate, ethylene-methyl acrylate-glycidyl methacrylate and ethylene-glycidyl methacrylate. Glycidyl (meth)acrylate is preferably contained therein in a quantity of 1 to 60 wt. %, in particular 5 to 55 wt. %, more preferably 45 to 52 wt. % based on the total composition of the glycidyl (meth)acrylate-containing polymer.

Epoxide group-containing copolymers based on styrene, ethylene, acrylic ester and/or methacrylic ester are also considered as epoxide group-containing polymers.

The mixture preferably contains 0.01 to 5 wt. %, in particular 0.05 to 3 wt. %, more preferably 0.1 to 2 wt. % of epoxide group-containing polymer, based on the total composition.

The mixture, in addition to the principal constituents of starch or starch derivative, polyester and epoxide group-containing polymer, can contain conventional additives such as, for example, processing aids, plasticizers, stabilisers, flame retardants and/or fillers.

The method according to the invention provides for the mixture to be homogenised. Homogenisation can be carried out by means of any procedures familiar to the person skilled in the art who is active in the field of plastics technology. Preferably, the mixture is homogenised by dispersing, stirring, kneading and/or extruding. According to a preferred embodiment of the invention, shear forces act on the mixture during homogenisation. Suitable production methods for thermoplastic polymers containing starch, which can also be analogously applied to the production of the polymer material according to the invention, are described, for example, in the publications EP 0 596 437 B1 and EP 0 917 540 B1.

According to a preferred embodiment of the invention, the mixture is heated during homogenisation (e.g. in the extruder), preferably to a temperature of 90 to 250° C., in particular 130 to 220° C.

According to the invention, it is preferred to keep the water content of the mixture as low as possible. Preferably, the water content of the mixture is set to less than 10 wt. %, in particular less than 7 wt. %, more preferably less than 5 wt. %, in particular less than 3 wt. %, even more preferably less than 1.5 wt. % and most preferably less than 1 wt. %, based on the total composition.

Preferably, the water content is set by drying during homogenisation. The drying process can be carried out, for example, by degassing the mixture or the melt, advantageously by removing the water vapour during extrusion.

According to another preferred embodiment of the invention, the polymer material produced according to the method according to the invention has thermoplastic properties. Preferably, the material can be thermoplastically processed.

With the method according to the invention, it is possible to produce unplasticised, thermoplastic polymer blends based on starch, which have a starch content of at least 34 wt. % and, at the same time, have excellent mechanical properties. Unplasticised in this connection means, in particular, that the polymer blends do not contain any glycerol and/or any sorbitol. In particular, films can be produced from the polymer material produced according to the method according to the invention, which have an elongation at break in accordance with DIN 53455 of at least 200%, and/or a dart drop value in accordance with ASTM D-1709 of at least 5 g/μm.

The invention therefore also relates to a starch-containing, thermoplastically processable polymer material, wherein (a) the polymer material contains less than 10 wt. % low-molecular substances, based on the total composition, (b) the starch proportion of the polymer material is at least 34 wt. % and (c) a film produced from the polymer material has an elongation at break in accordance with DIN 53455 of at least 200% and/or a dart drop value in accordance with ASTM D-1709 of at least 5 g/μm.

The starch-containing material according to the invention contains less than approximately 10 wt. % low-molecular substances and is, thereby, essentially unplasticised. In terms of the invention, low-molecular substances are understood to be substances with a molecular weight of less than 500 g/mol, in particular less than 250 g/mol. Low-molecular substances in terms of the invention, are, in particular, water, glycerol, sorbitol and/or mixtures thereof.

According to a preferred embodiment of the invention, the polymer material according to the invention contains less than 7 wt. %, in particular less than 5 wt. %, preferably less than 3 wt. % low-molecular substances, based on the total composition. According to another preferred embodiment of the invention, the polymer material according to the invention does not contain any glycerol and/or any sorbitol.

According to a further preferred embodiment of the invention, the starch proportion of the polymer material is at least 35 wt. %, in particular at least 36 wt. %, preferably at least 37 wt. %, more preferably at least 38 wt. % and most preferably at least 39 wt. %.

The polymer material according to the invention can also contain a polyester as another constituent, preferably in an amount less than 70 wt. %, in particular less than 65 wt. %, more preferably less than 60 wt. %, most preferably less than 55 wt. %.

The polymer materials according to the invention are suitable for a wide variety of purposes. The materials are, in particular, suitable for producing moulded parts, films or fibres. Consequently, the invention also relates to moulded parts, films or fibres produced from the materials according to the invention.

The invention will be subsequently described more closely by means of exemplary embodiments.

EXAMPLE 1

Producing Glycidyl-Modified Polymer Material Containing Starch

A mixture consisting of native potato starch, aliphatic-aromatic copolyester and epoxide group-containing polymer in the proportions specified below was filled into a twin-screw extruder.

A random copolyester based on 1,4-butanediol, adipic acid and terephthalic acid having a glass transition temperature (Tg) of −30 to −35° C. and a melting range of 105 to 115° C. was used as the aliphatic-aromatic copolyester.

A random copolymer based on styrene-methyl methacrylate-glycidyl methacrylate having a molecular weight Mw of approximately 6,800 and an epoxy group equivalent weight of 285 g/mol (additive A) was added as the epoxide group-containing polymer (glycidyl additive).

The mixture was intensively mixed in the extruder within a temperature range from 150 to 190° C., wherein the melt was at the same time degassed in order to dehydrate the mixture. A homogenous melt was formed which could be extracted and granulated. The water content of the compound homogenised in the way described and thermoplastically processed was under 1 wt. %.

By mixing and homogenising the starch with aliphatic-aromatic copolyester a two-phase blend was produced, in which the starch forms the disperse phase and the aliphatic-aromatic copolyester forms the continuous phase. The addition of epoxide group-containing polymer (i.e. glycidyl-containing polymer) caused intra- and intermolecular chemical cross-linking of starch and aliphatic-aromatic copolyester, which had a significant effect on the mechanical properties of the thermoplastic blend produced.

From the materials produced, films having a thickness of approximately 40 μm were manufactured by blow film extrusion. To this effect, the granulate was conveyed into a single-screw extruder (L/D=30, intake cooled, screen 250 μm), melted at 165° C. to 190° C., blown up over a tubular die (Mono, die gap 0.8 mm) to form the film bubble (blow-up ratio 3.5) and after flattening was removed.

EXAMPLE 2

In this example, the effect of glycidyl additive on the mechanical properties of blown films having different starch contents was determined.

Various polymer materials containing starch were produced from aliphatic-aromatic copolyester (59.5 to 66.1 wt. %), native potato starch (33.4 to 40 wt. %) and epoxide group-containing copolymer (0.5 wt. %) according to Example 1. The proportion of native potato starch was varied in the course of this between 33.4 and 40 wt. % step by step at the expense of the aliphatic-aromatic copolyester (see FIGS. 1 and 2).

As a comparison composition, polymer material was produced without glycidyl additive from aliphatic-aromatic copolyester (66.6 wt. %) and native potato starch (33.4 wt. %) according to the procedure described in Example 1.

After compounding the different composition variants, blown films were produced from the polymer materials produced and their mechanical properties determined. In particular, the tensile strength (TS), elongation at break (EB), MFR (Melt Flow Rate) and dart drop values (puncture resistance) of the films were determined.

FIG. 1 shows the tensile strengths and elongations at break of the films produced with different starch contents.

Compared to a standard film without glycidyl additive produced from the comparison composition, the corresponding glycidyl-modified film with the same starch content (33.4 wt. %) has a considerably higher tensile strength. This difference leads, due to the tension values generally decreasing with an increasing starch proportion, to comparable tensile strengths of standard films with 33.4 wt. % starch and glycidyl-modified films with 40 wt. % starch.

Provided that the starch content is the same, the value for the elongation at break of the glycidyl-modified film does not differ from that of the standard film. By using glycidyl additive, however, even for a film with a starch proportion of 40% the level of elongation at break (=elasticity) can be maintained at over 400%.

At the same time, it has to be taken into account that films consisting of polymer material of the same composition without glycidyl additive with a more than 34% starch proportion are extremely grainy, brittle and fragile, so that determining mechanical characteristics is practically impossible.

Figure 2:
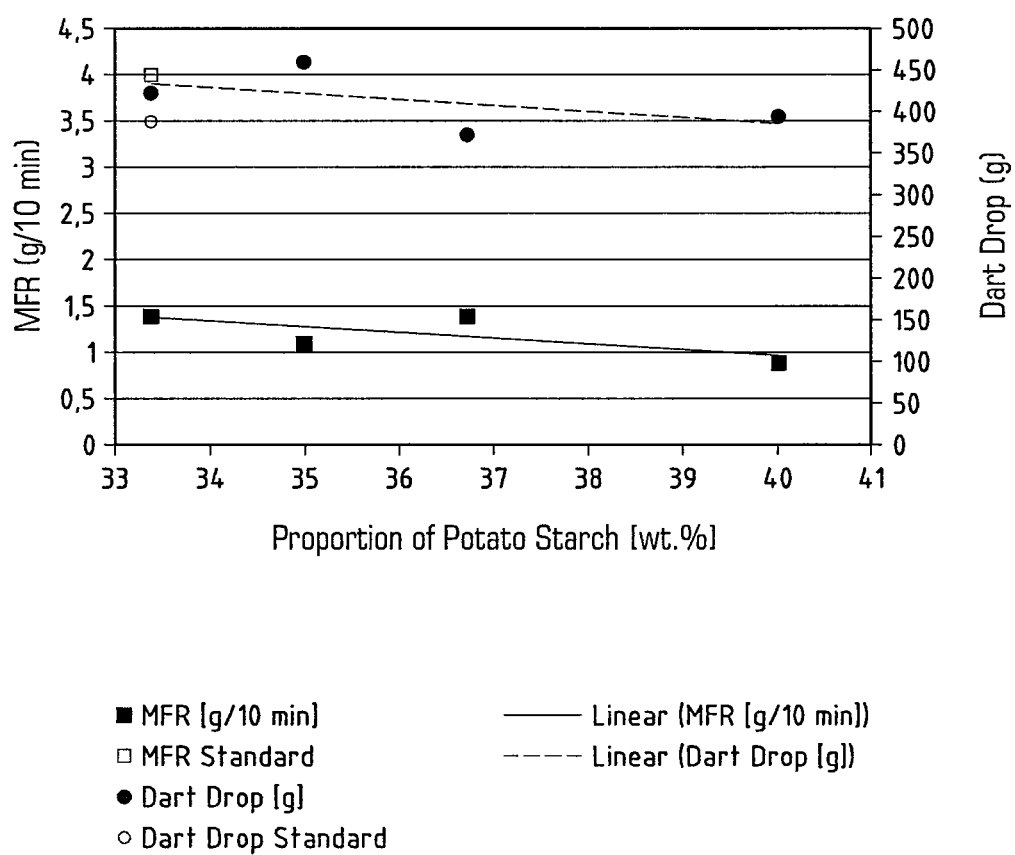
FIG. 2 is a graph showing the effect of starch proportion on MFR and dart drop.

In FIG. 2 the MFR (Melt Flow Rate) and the dart drop values (puncture resistance) of glycidyl-modified films with increasing starch content are illustrated.

It emerges from FIG. 2 that both curves only fall slightly with increasing starch content. While the dart drop values are at the same level for the standard composition without glycidyl additive and for the modified composition, the glycidyl additive brings about a fall in the MFR to less than half of the standard value.

The distinctly lowered MFR level of the formulations treated with glycidyl in comparison to the standard film without glycidyl additive is—without being tied down to one specific theory—to be attributed to the epoxide-induced cross-linking of the polymer chains. The MFR emerges, therefore, as a suitable parameter for evaluating the chemical reaction of corresponding chain lengtheners/cross-linking agents.

What are also striking in FIG. 2 are the dart drop values which are stable over the entire starch concentration range. The observation, already made by plotting tensile strength and elongation at break (FIG. 1), is confirmed that by adding reactive glycidyl additives to the base composition the brittleness of the material, which usually increases with an increasing starch proportion, can be effectively counteracted.

EXAMPLE 3

In this example, the effect of different glycidyl additives on the mechanical properties of blown films containing starch was determined.

Example 2 was repeated with three different epoxide-containing polymers (glycidyl additives).

Various polymer materials containing starch were produced from aliphatic-aromatic copolyester (59.5 to 66.1 wt. %), native potato starch (33.4 to 40 wt. %) and epoxide group-containing copolymer (additive A, B or C, see below) (0.5 wt. %) according to the procedure described in Example 1. The proportion of native potato starch was varied in the course of this between 33.4 and 40 wt. % step by step at the expense of the aliphatic-aromatic copolyester (see FIGS. 3 and 4).

As a comparison composition, polymer material was produced without glycidyl additive from aliphatic-aromatic copolyester (66.6 wt. %) and native potato starch (33.4 wt. %) according to the procedure described in Example 1.

A random copolymer based on styrene-methyl methacrylate-glycidyl methacrylate having a molecular weight Mw, of approximately 6,800 and an epoxy group equivalent weight of 285 g/mol was used as additive A.

A random copolymer based on ethylene-methyl acrylate-glycidyl methacrylate having approx. 24 wt. % methyl acrylate, 68 wt. % ethylene and 8 wt. % glycidyl methacrylate and an epoxy group equivalent weight of 1775 g/mol was used as additive B.

A random copolymer based on ethylene-glycidyl methacrylate having approx. 92 wt. % ethylene and 8 wt. % glycidyl methacrylate and an epoxy group equivalent weight of 1775 g/mol was used as additive C.

The glycidyl additives used differ in particular with regard to their content of reactive epoxy units. The mass-related concentration of epoxy units is higher by a factor of 6.23 in additive A than in additives B and C. Thus, additive B and additive C with the same originally weighted-in quantity contain less than a sixth of reactive epoxy groups compared to additive A.

This significant difference has a correspondingly considerable effect on the properties of comparably produced compositions.

Figure 3:
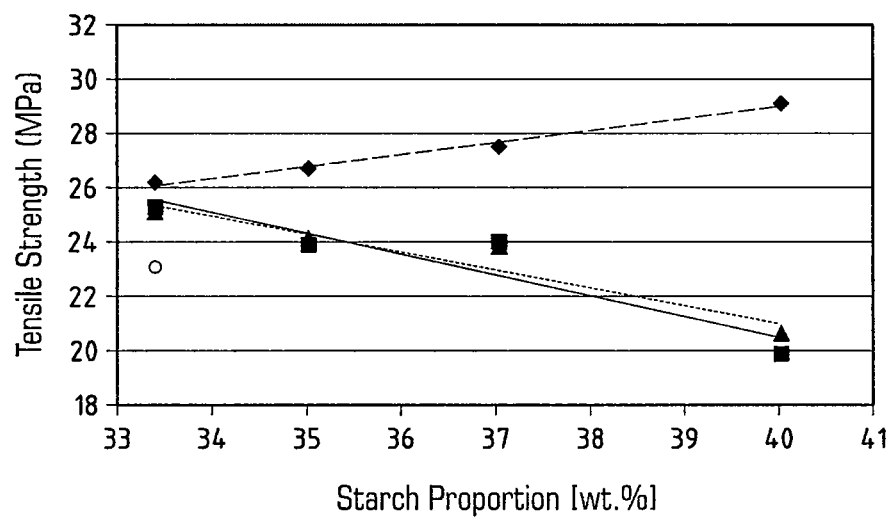
FIG. 3 is a graph showing the effect of different glycidyl additives on the tensile strength.
Figure 4:
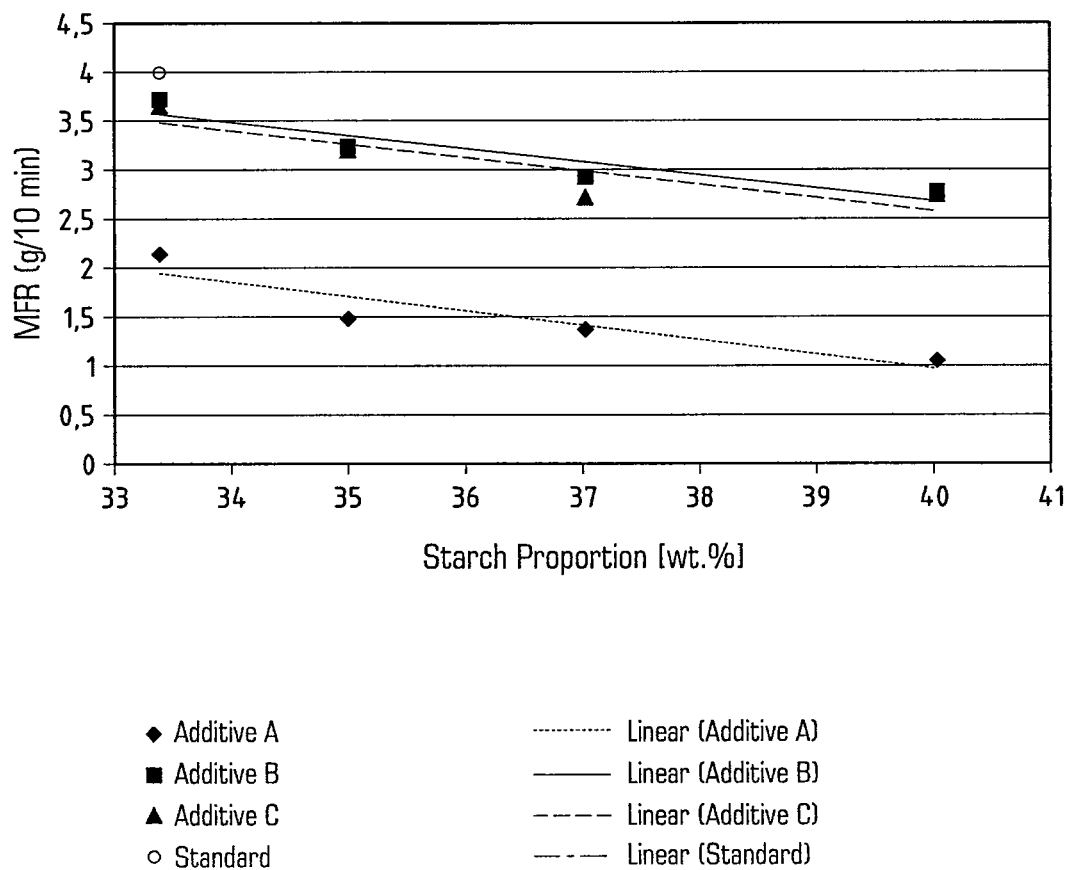
FIG. 4 is a graph showing the effect of different glycidyl additives on the MFR course.

FIGS. 3 and 4 show, by way of example, the starch-content dependent development of tensile strength and MFR of polymer materials containing starch according to Example 2, offset in each case with 0.5% of the additives A, B or C.

It emerges from FIG. 3 that with additive A the tensile strength of the films increases linearly with increasing starch content, while with additives 2 and 3 it decreases.

It emerges from FIG. 4 that the MFR values, which all linearly fall slightly with an increasing starch proportion, are at a very low level for the material treated with additive A. A comparison of the materials treated with additives 2 and 3 with a standard film without glycidyl additive does not, in contrast, show the glycidyl additive having any perceptible effect on the melt flow rate.

The courses of the curves illustrated in FIGS. 3 and 4 show that it can hardly be detected that the additives 2 and 3 perceptibly affect the mechanical properties of the films with the concentration of 0.5 wt. % used. Nevertheless, an improvement in the compatibility of the starch and polyester constituents was also detected with the additives B and C in the concentration used compared to the comparison composition without glycidyl additive.

EXAMPLE 4

In this example, the effect of different concentrations of epoxide group-containing polymer (glycidyl additive) on the mechanical properties of blown films having a starch content of up to 42 wt. % was determined.

Firstly, the effectiveness of different additive concentrations was tested at a manufacturing plant (ZSK 70/7). For this purpose, materials with three different additive concentrations were compounded (0.1 wt. % glycidyl additive, 0.5 wt. % glycidyl additive and a comparison composition (standard) without additive). Additive A from Example 3 was used as the epoxide group-containing polymer.

Various polymer materials containing starch were produced from aliphatic-aromatic copolyester (57.5 to 66.5 wt. %), native potato starch (33.4 to 42 wt. %) and epoxide group-containing polymer (0.1 and 0.5 wt. %) according to Example 1. The proportion of native potato starch was varied in the course of this between 33.4 and 42 wt. % step by step at the expense of the aliphatic-aromatic copolyester (see FIGS. 5 and 6). Equally, the proportion of epoxide group-containing polymer (additive A) was varied at the expense of the aliphatic-aromatic copolyester.

As a comparison composition, polymer material was produced without glycidyl additive from aliphatic-aromatic copolyester (66.6 wt. %) and native potato starch (33.4 wt. %) according to the procedure described in Example 1.

Figure 5:
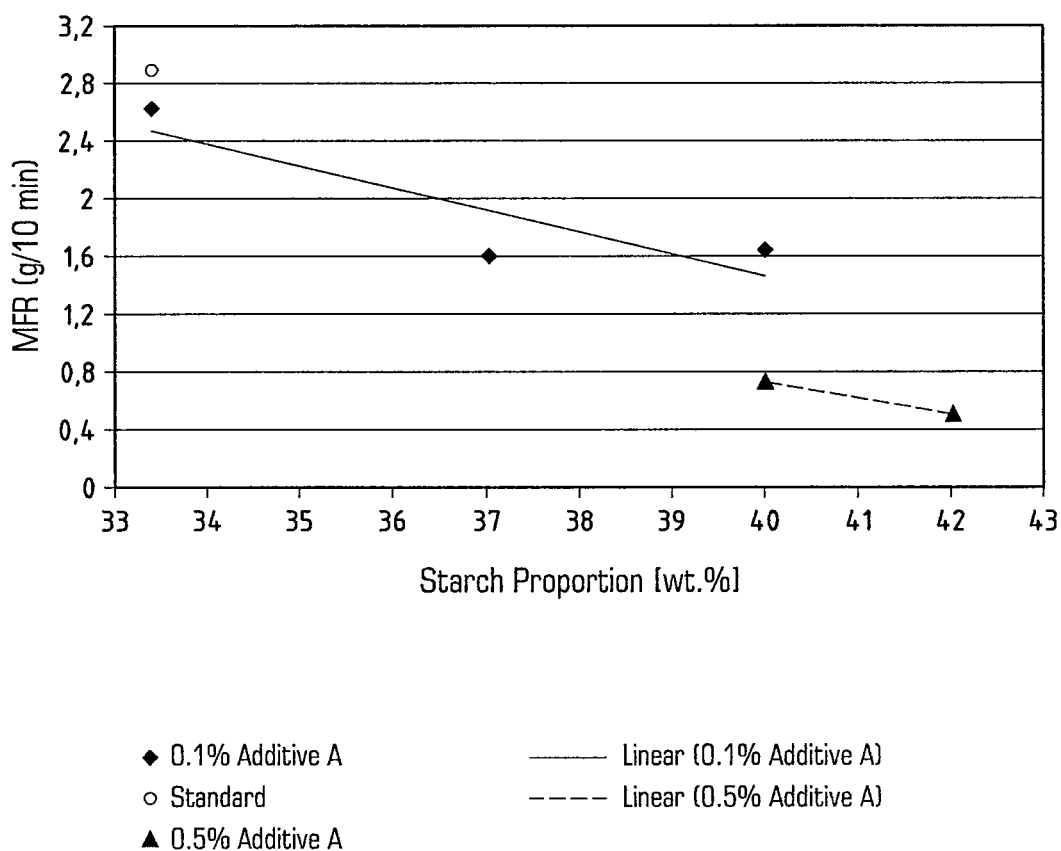
FIG. 5 is a graph showing the effect of different glycidyl additives on the MFR course.

FIG. 5 shows the course of the melt flow rate (MFR) of blown films produced from the materials, dependent on the starch content and the concentration of additive. It is evident from the values that the melt flow rate (MFR) (i.e. the flowability) reduces with increasing starch content and increasing glycidyl concentration. In comparison to the standard composition (circle) the MFR value of the formulation with 42 wt. % starch and 0.5 wt. % glycidyl additive falls to less than a fifth (triangle), an indication of extensive cross-linking of the contained polymers.

Without being tied down to one specific theory, this course can be explained by a cross-linking reaction of the glycidyl additive with the polyester and the starch. The sudden halving of the MFR at 40 wt. % starch in the changeover from the continuous line to the dashed line shows that the falling MFR value cannot be solely attributed to an increase in the starch content (as is so in the case of the continuous curve between 33 and 40 wt. %) but can also be significantly attributed to an increased reaction of the glycidyl additive used in more concentrated form.

Figure 6:
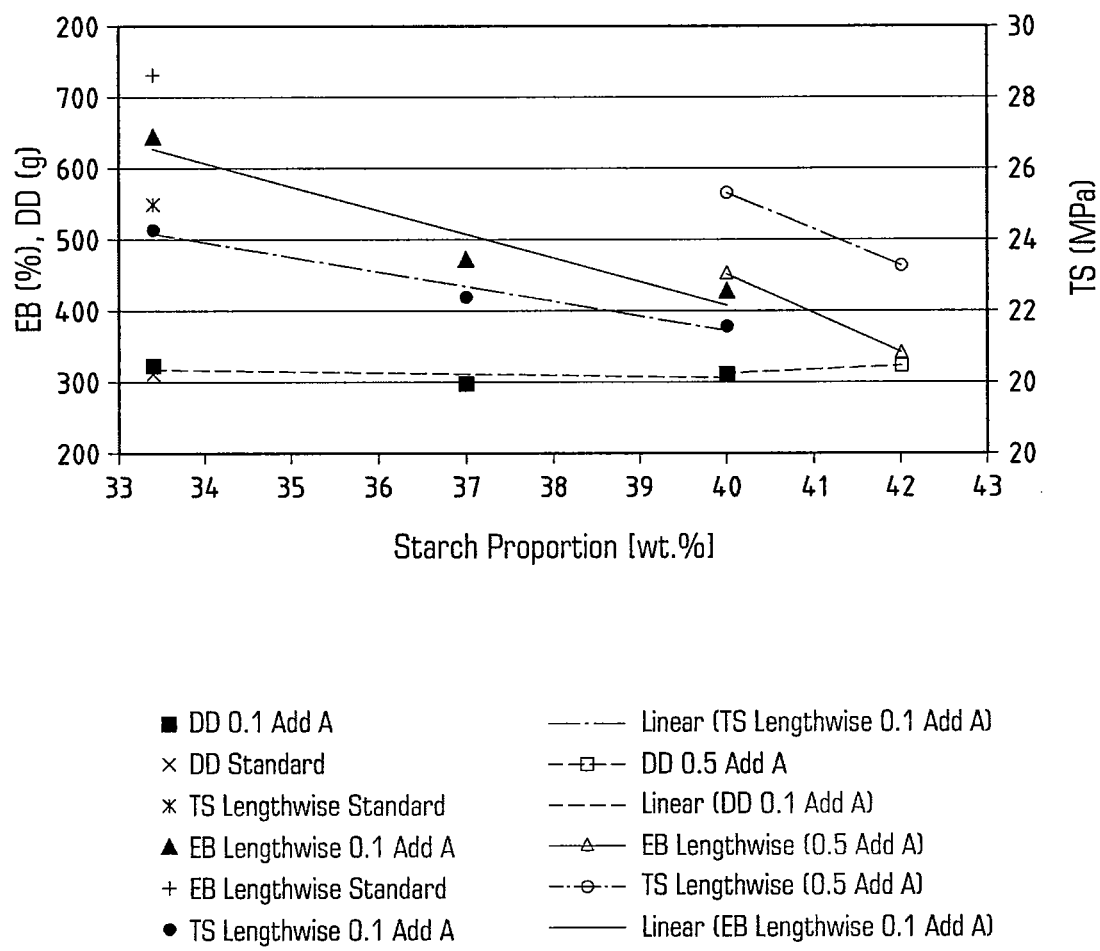
FIG. 6 is a graph showing the effect of different glycidyl additives on elongation at break and tensile strength.

In FIG. 6, the course of tensile strength (TS), elongation at break (EB) and dart drop (DD) is illustrated for films with different contents of starch and glycidyl additive. While TS and EB decrease with an increasing starch content, the DD value remains at a constant level.

It is evident from FIG. 6 that the elongation at break, linearly decreasing with increasing starch content, is not perceptibly affected by adding glycidyl additive. Even at a 0.5 wt. % proportion of additive (continuous curve), the value falls further after exceeding 40 wt. % starch. The puncture resistance (DD value) maintains itself at a constant level over the entire investigated range.

Without being tied down to one specific theory, it is assumed that the effect of a DD value normally decreasing with an increasing starch content (i.e. the film becomes more brittle) is compensated for by polymer cross-linking with the glycidyl additive. The strand cross-linking, more extensive with a higher glycidyl additive content, can be substantiated by a significantly higher tensile strength with the same starch content (sudden change-over of the dash-dotted curve at 40 wt. % starch).

EXAMPLE 5

In this example, the glycidyl additives 1 and 2 from Example 3 with equivalent glycidyl proportions were compared.

Firstly, a polymer material containing starch was produced from aliphatic-aromatic copolyester (59.9 wt. %), native potato starch (40 wt. %) and additive A from Example 3 (0.1 wt. %) according to the procedure described in Example 1.

Subsequently, a polymer material containing starch was produced from aliphatic-aromatic copolyester (59.4 wt. %), native potato starch (40 wt. %) and Additive B from Example 3 (0.6 wt. %) according to the procedure described in Example 1.

Figure 7:
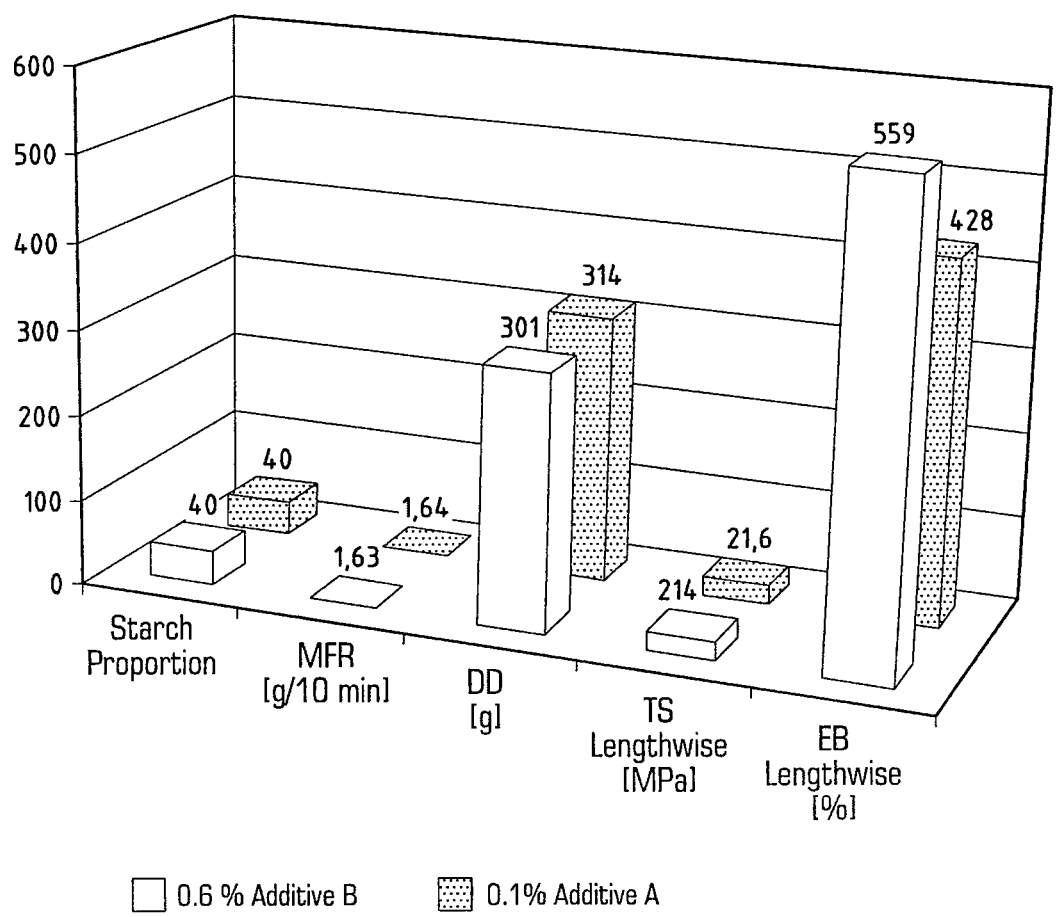
FIG. 7 is a graph showing the effect of different glycidyl additives with equivalent glycidyl proportions.

The two materials produced in this way and the two blown films produced from them were compared with one another. FIG. 7 shows the results:

FIG. 7 shows that the additives 1 and 2, with quantitatively equivalent glycidyl proportions (0.1 wt. % additive A versus 0.6 wt. % additive B), produce comparable material properties in the polymer material. Only the value for the elongation at break (EB) is perceptibly higher with the film containing additive B.

From the results, the following can be established based on the tests carried out:

The material properties of generic polymer materials containing starch can be significantly altered by adding glycidyl-containing additives. While conventional polymer materials containing starch without glycidyl additive have inadequate mechanical properties above approximately 34 wt. %, just a content of 0.1% of glycidyl additive enables a polymer material to be produced with a starch content of 40 wt. % with, at the same time, excellent mechanical properties.

While the increase in the starch content inevitably is at the expense of the elasticity of the glycidyl-modified material, the puncture resistance of the glycidyl-modified material is not affected by an increase in the starch proportion.

Without being tied down to one specific theory, it is assumed that the glycidyl additive acts as a compatibiliser between the otherwise incompatible starch and polyester polymers. The efficiency of the polymer cross-linking is exhibited in increased tensile strength values with, at the same time, a lower melt flow rate (MFR).

The invention has been described above by means of exemplary embodiments. At the same time, it is to be understood that the invention is not limited to the exemplary embodiments described. Rather, varied options for modification and refinement arise within the scope of the invention for the person skilled in the art and the scope of protection for the invention is, in particular, defined by the subsequent claims.

The invention claimed is:

1. Method for producing a polymer material containing starch, comprising:
   (a) producing a mixture comprised of:
      1 to 75 wt. % of starch and/or starch derivative;
      10 to 85 wt. % of polyester; and
      0.01 to 7 wt. % of an epoxide group-containing polymer;
   (b) homogenizing the mixture by supplying thermal and/or mechanical energy; and
   (c) removing water by degassing the mixture during homogenization of the mixture to reduce the water content of the mixture, so that the end product after mixing has a water content of less than 1.5 wt. % based on the total composition of the mixture.

2. Method according to claim 1, wherein the mixture contains 5 to 75 wt. % of the starch and/or starch derivative.

3. Method according to claim 1, wherein the mixture contains 20 to 85 wt. % of the polyester.

4. Method according to claim 1, wherein the mixture contains 0.01 to 5 wt. % of the epoxide group-containing polymer.

5. Method according to claim 1, wherein the polymer material is biologically degradable in accordance with EN 13432.

6. Method according to claim 1, wherein the polyester is selected from the group consisting of aliphatic-aromatic copolyester, aliphatic polyester, aromatic polyesters, PHA, PLA, PHB and PHBV.

7. Method according to claim 1, wherein the polyester has a glass transition temperature (Tg) of less than 0° C.

8. Method according to claim 1, wherein a copolyester or random copolyester is used as the aliphatic-aromatic polyester and is based at least on adipic acid.

9. Method according to claim 1, wherein the polyester is an aliphatic-aromatic copolyester or random copolyester based at least on 1,4-butanediol, adipic acid and, terephthalic acid, or a terephthalic acid derivative, or dimethyl terephthalate DMT.

10. Method according to claim 9, wherein the polyester has a glass transition temperature (Tg) in a range of −25 to −40° C. and/or a melting range of 100 to 120° C.

11. Method according to claim 1, wherein the polyester is an aliphatic polyester selected from the group consisting of polyhydroxyvalerate, polyhydroxybutyrate-hydroxyvalerate copolymer and polycaprolactone.

12. Method according to claim 1, wherein the polyester is an aliphatic polyester based on succinate, wherein the polyester is selected from the group consisting of polybutylene succinate (PBS), polybutylene succinate adipate (PBSA), and polyethylene succinate (PES).

13. Method according to claim 1, wherein the polyester is biologically degradable in accordance with EN 13432.

14. Method according to claim 1, wherein the epoxide group-containing polymer is a copolymer.

15. Method according to claim 1, wherein the epoxide group-containing polymer is a glycidyl(meth)acrylate-containing polymer.

16. Method according to claim 15, wherein the glycidyl (meth)acrylate-containing polymer is a copolymer consisting of (a) styrene and/or ethylene and/or methyl methacrylate and/or methyl acrylate and (b) glycidyl(meth)acrylate.

17. Method according to claim 15, wherein the glycidyl (meth)acrylate-containing polymer is an epoxide group-containing copolymer based on styrene, ethylene, acrylic ester and/or methacrylic ester.

18. Method according to claim 15, wherein the glycidyl (meth)acrylate-containing polymer is a copolymer which is selected from the group consisting of styrene-methyl methacrylate-glycidyl methacrylate, ethylene-methyl acrylate-glycidyl methacrylate, and ethylene-glycidyl methacrylate.

19. Method according to claim 15, wherein the glycidyl (meth)acrylate-containing polymer contains glycidyl(meth) acrylate in a quantity of 1 to 60 wt. % based on the total composition of the glycidyl(meth)acrylate-containing polymer.

20. Method according to claim 1, wherein the epoxide group-containing polymer has a molecular weight ($M_w$) of 1,000 to 25,000.

21. Method according to claim 1, wherein the mixture is homogenized by at least of dispersing, stirring, kneading or extruding.

22. Method according to claim 21, wherein the mixture is homogenized by extrusion.

23. Method according to claim 1, wherein the mixture is homogenized by shear forces acting on the mixture.

24. Method according to claim 1, wherein during homogenization or subsequent extrusion the mixture is heated to a temperature of 90 to 250° C.

25. Method according to claim 1, wherein the water content of the mixture is set to less than 1 wt. % based on the total composition.

26. Method according to claim 1, further comprising forming the polymer material into a film having a tensile strength in accordance with DIN 53455 of 5 to 60 N/mm$^2$.

27. Method according to claim 1, further comprising forming the polymer material into a film having an elongation at break in accordance with DIN 53455 of 100 to 1,000%.

28. Starch-containing, thermoplastically processable polymer composition, comprising:
   less than 3 wt. % water based on the total composition,
   a polymer material containing a polyester selected from the group consisting of aliphatic-aromatic copolyesters, aliphatic polyesters, aromatic polyesters, PHA, PLA, PHB, and PHBV, the polymer material containing an epoxide group-containing polymer having a molecular weight ($M_w$) in a range of 1,000 to 25,000, and at least 34 wt. % starch provided by native starch from which water has been removed by degassing during homogenization of the polymer material, wherein the polymer material is adapted so that a film produced from the polymer material has an elongation at break in accordance with DIN 53455 of at least 200% and/or a dart drop value in accordance with ASTM 0-1709 of at least 5 g/μm.

29. Polymer material according to claim 28, wherein the polymer material contains less than 7 wt. % glycerol, sorbitol and/or mixtures thereof, based on the total composition.

30. Polymer material according to claim 28, wherein the starch proportion of the polymer material is at least 35 wt. %.

31. Polymer material according to claim 28, wherein the polymer material is adapted so that a film produced from the polymer material has an elongation at break in accordance with DIN 53455 of at least 300% and/or a dart drop value in accordance with ASTM 0-1709 of at least 10 g/μm.

32. Polymer material according to claim 28, wherein the polymer material contains the polyester in an amount less than 70 wt. %.

33. Polymer material according to claim 28, wherein the polyester has a glass transition temperature (Tg) of less than 0° C.

34. Method according to claim 1, further comprising forming the polymer material into an article of manufacture selected from the group consisting of molded parts, films, and fibers.

35. Polymer material according to claim 28, wherein the polymer material is in the form of a molded part, film, or fiber.

36. Method according to claim 1, wherein the mixture contains 10 to 75 wt. % of the starch and/or starch derivative.

37. Method according to claim 1, wherein the mixture contains 15 to 70 wt. % of the starch and/or starch derivative.

38. Method according to claim 1, wherein the mixture contains 25 to 55 wt. % of the starch and/or starch derivative.

39. Method according to claim 1, wherein the mixture contains 34 to 51 wt. % of the starch and/or starch derivative.

40. Method according to claim 1, wherein the mixture contains 30 to 80 wt. % of the polyester.

41. Method according to claim 1, wherein the mixture contains 40 to 80 wt. % of the polyester.

42. Method according to claim 1, wherein the mixture contains 0.05 to 3 wt. % of the epoxide group-containing polymer.

43. Method according to claim 1, wherein the mixture contains 0.1 to 2 wt. % of the epoxide group-containing polymer.

44. Method according to claim 1, wherein the polyester has a glass transition temperature (Tg) of less than −4° C.

45. Method according to claim 1, wherein the polyester has a glass transition temperature (Tg) of less than −10° C.

46. Method according to claim 1, wherein the polyester has a glass transition temperature (Tg) of less than −20° C.

47. Method according to claim 1, wherein the polyester has a glass transition temperature (Tg) of less than −30° C.

48. Method according to claim 9, wherein the polyester has a glass transition temperature (Tg) in a range of −30 to −35° C. and/or a melting range of 105 to 115° C.

49. Method according to claim 15, wherein the glycidyl (meth)acrylate-containing polymer contains glycidyl(meth) acrylate in a quantity of 5 to 55 wt. % based on the total composition of the glycidyl(meth)acrylate-containing polymer.

50. Method according to claim 15, wherein the glycidyl (meth)acrylate-containing polymer contains glycidyl(meth) acrylate in a quantity of 45 to 52 wt. % based on the total composition of the glycidyl(meth)acrylate-containing polymer.

51. Method according to claim 1, wherein the epoxide group-containing polymer has a molecular weight ($M_w$) of 3,000 to 10,000.

52. Method according to claim 1, wherein during homogenization or subsequent extrusion the mixture is heated to a temperature of 130 to 220° C.

53. Method according to claim 1, wherein the water content of the mixture is reduced by forming the polymer mixture into a melt and degassing the mixture while in the form of the melt.

54. Method according to claim 1, further comprising forming the polymer material into a film having a tensile strength in accordance with DIN 53455 of 10 to 40 N/mm$^2$.

55. Method according to claim 1, further comprising forming the polymer material into a film having an elongation at break in accordance with DIN 53455 of 200 to 800%.

56. Polymer material according to claim 28, wherein the polymer material contains less than 5 wt. % glycerol, sorbitol and/or mixtures thereof, based on the total composition.

57. Polymer material according to claim 28, wherein the polymer material contains less than 3 wt. % glycerol, sorbitol and/or mixtures thereof, based on the total composition.

58. Polymer material according to claim 28, wherein the starch proportion of the polymer material is at least 37 wt. %.

59. Polymer material according to claim 28, wherein the starch proportion of the polymer material is at least 39 wt. %.

60. Polymer material according to claim 28, wherein the polymer material contains the polyester in an amount less than 65 wt. %.

61. Polymer material according to claim 28, wherein the polymer material contains the polyester in an amount less than 60 wt. %.

62. Polymer material according to claim 28, wherein the polymer material contains the polyester in an amount less than 55 wt. %.

63. Polymer material according to claim 28, wherein the polyester is an aliphatic-aromatic copolyester or random copolyester based at least on 1,4-butanediol, adipic acid and, terephthalic acid, or a terephthalic acid derivative, or dimethyl terephthalate DMT.

64. Polymer material according to claim 28, wherein the polyester has a glass transition temperature (Tg) in a range of −25 to −40° C. and/or a melting range of 100 to 120° C.

65. Polymer material according to claim 28, wherein the polyester is an aliphatic polyester selected from the group consisting of polyhydroxyvalerate, polyhydroxybutyrate-hydroxyvalerate copolymer and polycaprolactone.

66. Polymer material according to claim 28, wherein the polyester is an aliphatic polyester based on succinate, wherein the polyester is selected from the group consisting of polybutylene succinate (PBS), polybutylene succinate adipate (PBSA), and polyethylene succinate (PES).

67. Polymer material according to claim 28, wherein the polyester is biologically degradable in accordance with EN 13432.

68. Method for producing a polymer material containing starch, comprising:
(a) producing a mixture comprised of:
1 to 75 wt. % of starch and/or starch derivative;
10 to 85 wt. % of polyester; and
0.01 to less than 1 wt. % of an epoxide group-containing polymer;

(b) homogenizing the mixture by supplying thermal and/or mechanical energy;
(c) prior to extrusion, degassing the mixture to reduce the water content of the mixture to less than 5 wt. % based on the total composition of the mixture; and
(d) extruding the degassed mixture to form a film.

* * * * *